(12) United States Patent
Wilder

(10) Patent No.: US 11,334,046 B2
(45) Date of Patent: *May 17, 2022

(54) MOVABLE GANTRY SYSTEM CONFIGURED TO INTERFACE WITH JIGS OF DIFFERENT SIZES

(71) Applicant: William Wilder, Seattle, WA (US)

(72) Inventor: William Wilder, Seattle, WA (US)

(73) Assignee: Wilder Systems, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,989

(22) Filed: Feb. 4, 2020

(65) Prior Publication Data

US 2020/0174441 A1 Jun. 4, 2020

Related U.S. Application Data

(63) Continuation of application No. 15/610,465, filed on May 31, 2017, now Pat. No. 10,558,192.

(60) Provisional application No. 62/345,689, filed on Jun. 3, 2016.

(51) Int. Cl.
*G05B 19/19* (2006.01)

(52) U.S. Cl.
CPC .... *G05B 19/19* (2013.01); *G05B 2219/40293* (2013.01)

(58) Field of Classification Search
CPC .......... G05B 19/19; G05B 2219/40293; G05B 2219/50132; G05B 2219/35039; B25J 9/162; B25J 9/1687
See application file for complete search history.

(56) References Cited

U.S. PATENT DOCUMENTS

| 10,558,192 | B2 | 2/2020 | Wilder | |
|---|---|---|---|---|
| 2001/0049953 | A1 | 12/2001 | Nagasawa | |
| 2002/0054795 | A1* | 5/2002 | Chalupa | G05B 19/402 408/1 R |
| 2007/0150089 | A1* | 6/2007 | Dolansky | G05B 19/128 700/173 |
| 2010/0024345 | A1 | 2/2010 | Mcadoo et al. | |

(Continued)

OTHER PUBLICATIONS

U.S. Appl. No. 15/610,465, "Final Office Action", dated Feb. 28, 2019, 20 pages.

(Continued)

*Primary Examiner* — Thomas C Lee
*Assistant Examiner* — Charles Cai
(74) *Attorney, Agent, or Firm* — Kilpatrick Townsend & Stockton LLP

(57) ABSTRACT

A movable gantry system is described. In an example, the movable gantry system is configured to interface with jigs of different types or sizes and/or with different positions of a same jig and/or to perform operations on different parts mounted in such jigs. To do so, the movable gantry system includes an end effector, a gantry, and a computing system. The end effector is mounted within the gantry and provides at least rotational movement to perform operations on a part. The gantry is movable and interfaces with a jig holding the part. Further, the gantry provides translational movement to the end effector. The computing system identifies the gantry and the part and controls the gantry and the end effector, thereby facilitating the operations on the part.

20 Claims, 14 Drawing Sheets

(56) References Cited

U.S. PATENT DOCUMENTS

| | | | |
|---|---|---|---|
| 2012/0147074 A1* | 6/2012 | Ikeda | B41J 25/308 |
| | | | 347/8 |
| 2014/0231242 A1 | 8/2014 | Brassier et al. | |
| 2014/0263216 A1 | 9/2014 | Clark | |
| 2015/0016712 A1 | 1/2015 | Rhoads et al. | |
| 2015/0314890 A1* | 11/2015 | DesJardien | B25J 5/007 |
| | | | 212/324 |
| 2015/0360390 A1 | 12/2015 | Weinhardt et al. | |
| 2016/0221768 A1 | 8/2016 | Kadaba et al. | |
| 2017/0173790 A1* | 6/2017 | Tan | B60T 7/16 |
| 2017/0220021 A1 | 8/2017 | Bode et al. | |
| 2017/0351239 A1 | 12/2017 | Wilder | |

OTHER PUBLICATIONS

U.S. Appl. No. 15/610,465, "Non-Final Office Action", dated Sep. 17, 2018, 14 pages.
U.S. Appl. No. 15/610,465, "Non-Final Office Action", dated Jun. 6, 2019, 22 pages.
U.S. Appl. No. 15/610,465, "Notice of Allowance", dated Oct. 24, 2019, 5 pages.

* cited by examiner

US 11,334,046 B2

MOVABLE GANTRY SYSTEM CONFIGURED TO INTERFACE WITH JIGS OF DIFFERENT SIZES

CROSS-REFERENCE TO RELATED APPLICATIONS

This application is a continuation of U.S. patent application Ser. No. 15/610,465, filed May 31, 2017, which claims the benefit of and priority under 35 U.S.C. § 119(e) to U.S. Provisional Patent Application No. 62/345,689, filed Jun. 3, 2016, which are incorporated herein by reference in their entirety.

BACKGROUND

In a typical aircraft manufacturing line, structural subassemblies (e.g. wing sections) are built up of elementary parts (e.g. spars, ribs, skins) by the installation of mechanical fasteners such as rivets into precisely drilled holes. All current manufacturing processes include drilling, fastening and other operations on these elementary parts to build a subassembly. Assemblies are generally built on jigs. Manufacturing techniques range in complexity from stationary jigs staffed by workers with hand tools to fully automated assembly lines equipped with monumental robotic installations.

In an illustrative example, an aircraft manufacturing line uses a drilling system. The drilling system enables tools to interface with airplane parts. Once an interface is set up, operating an interfacing tool becomes possible to perform particular drilling operations on a corresponding airplane part.

Typically, there are three existing types of drilling processes, each with its own drawbacks:
1. Manual tools
2. Semi-automated drilling tools
3. Monumental Machines Manual drilling with hand tools is highly labor intensive and prone to defect generation. Hole positions are defined by hard tooling such as drill templates. The template installation process is not very precise and can induce positional accuracy errors. These are subject to wear, requiring periodic inspection and recertification. If the design of the aircraft changes or a new variant is developed, new tooling may be needed. In a manual drilling process, each hole is processed by hand in at least four discrete steps: pilot drilling, full size drilling, reaming and countersinking. This is a labor intensive, defect prone process. At each step, the operator can generate a defect. Common defects include perpendicularity, scratches inside the bore of the hole, over depth countersinks, and use of the wrong size drill bit.

Various semi-automated tools exist to address some limitations of fully manual processes such as the four-step drilling sequence. One example is the advanced drilling unit (ADU) from Seti-Tec of Lognes, France. Like manual drilling tools, these tools too, are positioned using application-specific drilling jigs which should be remade if the design of the aircraft changes or the drilling tools should be used on a different component or aircraft model. Semi-automated tools suffer the same template positioning errors as manual drilling processes. As an improvement over simple hand drills, this type of machine can drill, ream and countersink in one shot, largely removing the operator from the hole quality equation. The process is single-operation focused (drills cannot route panels). It is still labor intensive with one-to-one or sometimes one-to-several corresponding operators-to-drills.

Monumental robotic installations are expensive and are often heavy enough to need a specially prepared foundation to support the weight of the machine. The fixed nature of the machines make factory reconfiguration impossible. These machines come with long lead times on the order of years, do not scale with increases in production volumes, and are costly to maintain. These machines are typically designed to process a single assembly for the life of the machine. There is little scope for reconfiguration to support manufacturing different models of product. Highly specialized personnel should be hired and trained to operate and maintain these large, complex pieces of equipment.

BRIEF DESCRIPTION OF THE DRAWINGS

Various embodiments in accordance with the present disclosure will be described with reference to the drawings, in which.

DETAILED DESCRIPTION

Figure 1:
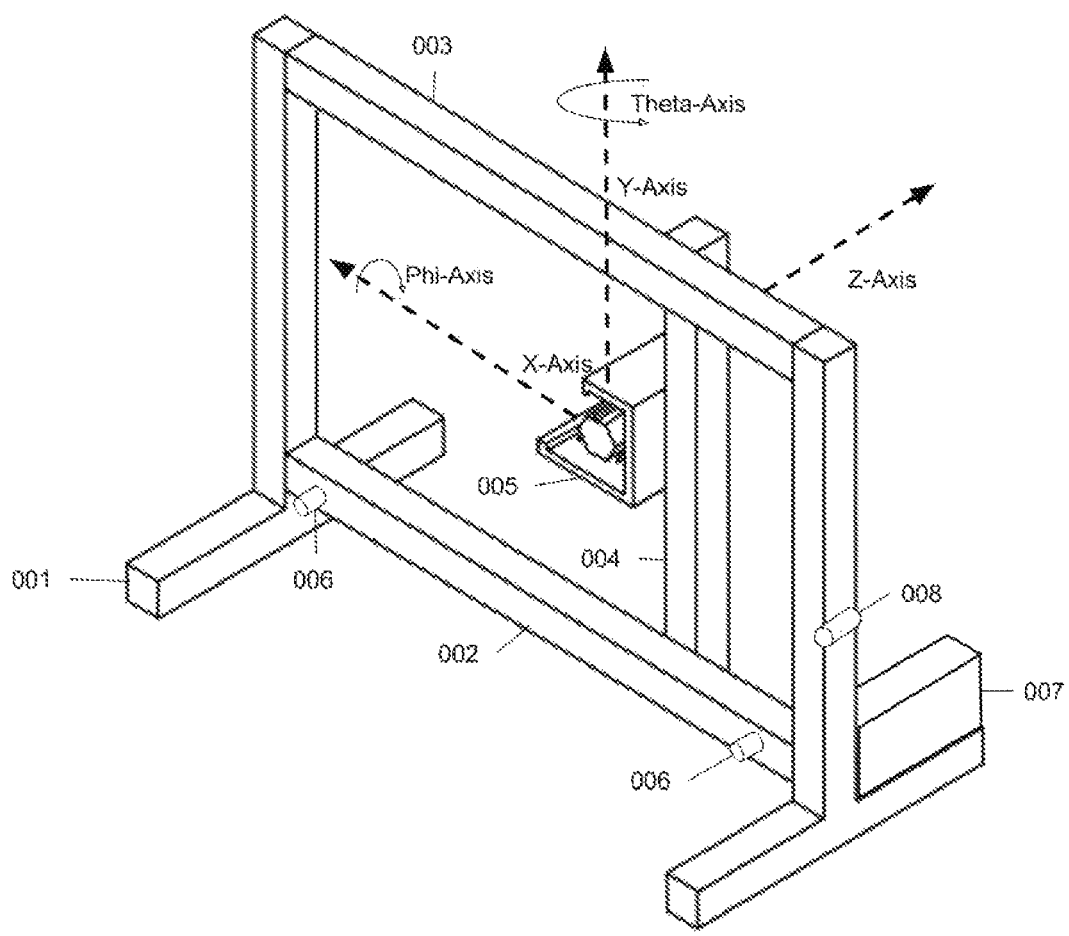
FIG. 1 illustrates an example end effector within a movable gantry system, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a Movable Gantry System (MGS). Generally, subassembly factories that wish to update their systems from a fully manual process to an automated process without the expense, risk and production losses associated with monumental robot installations have the possibility to integrate the MGS. For example, in a typical MGS wing section drilling application, the gantry system can be integrated to upgrade an existing manual assembly cell to drill, ream and countersink the array of holes used to fasten the wing components. When the gantry system is indexed to a jig loaded with elementary parts, the MGS identifies the jig, the aircraft type and serial number of the current assembly in the jig. The MGS queries a server for the current status of that assembly. Based on the design of the assembly and any manufacturing progress to date, the MGS can determine how to datum itself to the part and where to perform which sequence of operations to advance the assembly process. The MGS processes the assembly and, in real time, updates the server regarding the status of the assembly in the jig. A single MGS can be used to process multiple jigs serially, and multiple MGS can work and communicate in parallel with the server, optimizing production throughput.

Various embodiments of the MGS are described in the present disclosure. Generally, the MGS is movable. In other words, the MGS can be operated to move to different locations around an assembly line or within a manufacturing environment. The MGS can also enable different operations at the locations and can even be universal, or almost universal. In other words, different types, sizes, and/or sides of jigs holding different parts can be distributed at the locations. The MGS can interface with any of such jigs and can include and operate different types and/or configurations of end effectors to perform operations on any of such parts. A computing system, such as one including a server, can control some or all of the operations of the MGS. The MGS can provide real time data about the operations to the server, thereby enabling a manufacturing operator to have access to the most up-to-date information about the operations.

In an example, the MGS includes an end effector, a gantry, and a computing system. The end effector is configured to effectuate an operation on a part mounted to a jig. Generally, the operation includes a rotation of the end effector about one or more axes of a coordinate system. Examples of such an operation include pilot drilling, drilling, reaming, and countersinking.

In this example, the gantry contains the end effector through, for example, an interface. The end effector can interface with the gantry such that a portion of the end effector (e.g., a head of a drill) or the entire end effector can be replaced with another portion and/or end effector of the same or different type, in a line replaceable unit (LRU) or a plug-and-play fashion for example. This type of gantry-end effector interface allows the gantry to contain different end effectors suitable for different operations. In addition, the gantry can be dimensioned to interface with a plurality of jigs. The dimensioning can allow the gantry to interface with the plurality of jigs. The gantry can also be mobile such that the gantry is moved in proximity to the jig and such that the gantry interfaces with the jig based on proximity. The movability enables the relocation of the gantry to any jig of the plurality of jigs. Further, the gantry is configured to, upon indexing of the jig, provide a translational movement of the end effector along the one or more axes of the coordinate system. The translational movement enables the positioning of the end effector at a desired position parallel to a particular portion of the part mounted on the jig (e.g., parallel to a point in a wing spar where a hole may be desired).

Also in this example, the computing system is configured to perform a number of steps. These steps include identifying the jig and the part. For example the gantry can include a radio frequency identification (RFID) reader (or any other type of readers suitable for reading information encoded in a marker). Each of the jig and the part can have an attached RFID tag (or any suitable marker encoding information). The RFID tags include respective unique identifiers of the jig and the part. When read, the unique identifiers are transmitted to the computing system over a data network. The computing system stores or has access to a database that lists the jigs and parts. The computing system queries the database to identify the jig and the part based on the unique identifiers. The steps also include accessing a model of the part and a status of operations performed on the part based on the jig and the part being identified. For example, the database stores the models and statuses of different parts and jigs. The query result may return the model and the status. The steps also include determining datum points for the operation on the assembly based on the model, the status, and the indexing of the jig. For example, the model and status identify what a next operation should be and the location on the part for such an operation. The indexing enables the computing system to determine three dimensional coordinates of the location, thereby enabling the determination of datum points. The steps also include directing the translational movement and the rotation of the end effector based on the datum points. For example, the computing system sends instructions or remotely controls, over the data network, the translational movement of the gantry to position the end effector at the desired position given the datum points. The steps also include instructing the end effector to perform operations on the assembly at locations defined by the model and localized by the datum points. For example, the instructions are transmitted over the data network, thereby enabling the computing system to remotely control the end effector. The steps also include storing information about a status of the operation. For example, the computing system receives status data about the operations, where the status data is transmitted from the end effector and/or gantry over the data network. The computer system updates the status stored in the database based on received status data. This update enables an operator having access to the database to get real-time information about the operations and the different statuses.

FIG. 1 illustrates an example Movable Gantry System (MGS). The MGS is movable and can be configured and programmed to perform different operations on different parts or sets of parts (assemblies). Potential operations include drilling, reaming, countersinking, material cutting, routing, automated composite layup, welding etc. The assemblies can be distributed at different locations within a factory. The parts, assemblies and jigs can vary in size, shapes, and/or geometry. Example assemblies include wings, tails, fuselage, etc. As an example, illustrated in FIG. 6, each assembly 57 can be loaded on a jig 56. Although an airplane assembly environment is described herein, the embodiments of the present disclosure are not limited as such. The embodiments similarly apply to other assembly and/or manufacturing environments, such as ones that relate to automobile, vessels, rockets, etc.

Figure 9:
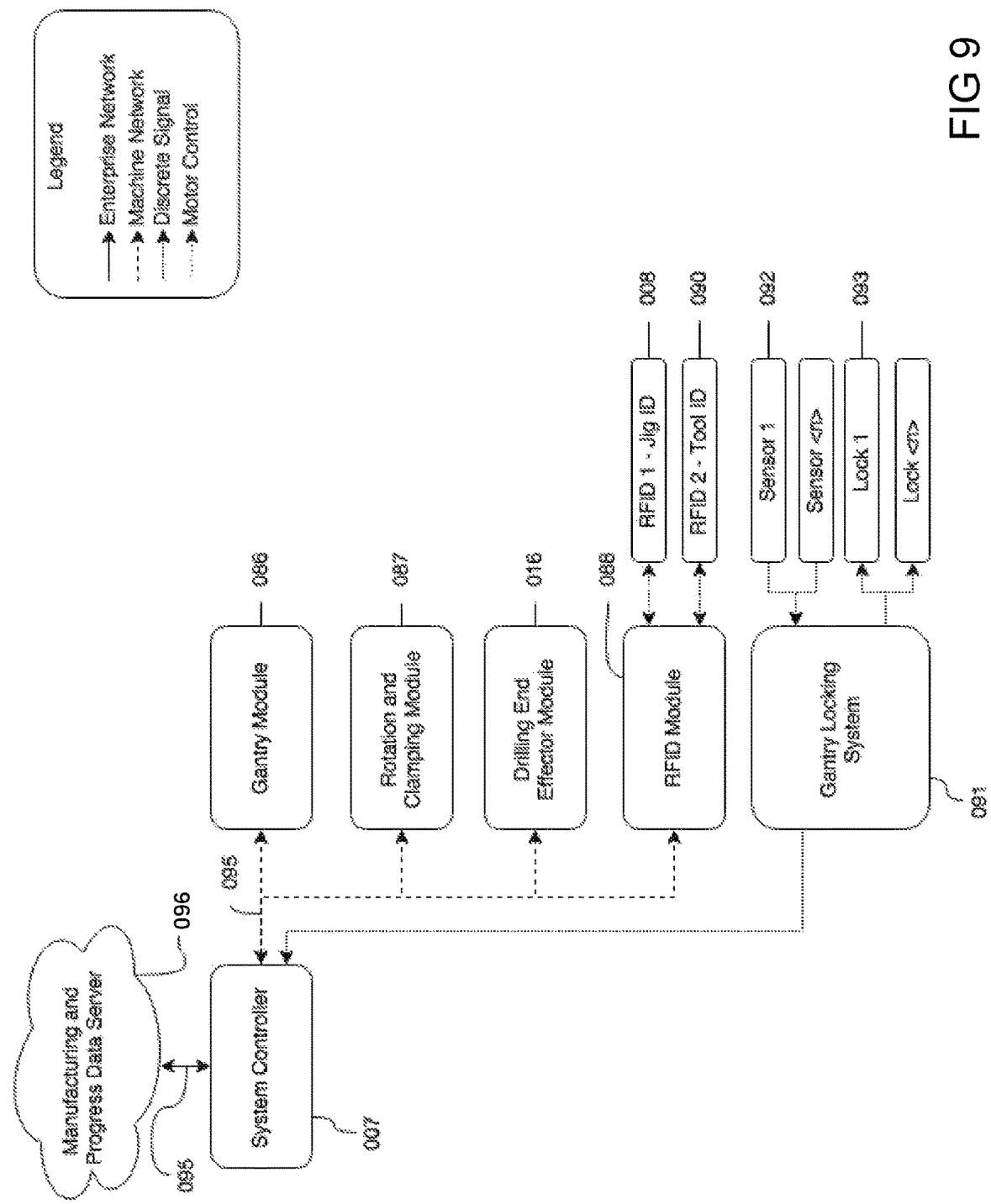
FIG. 9 illustrates an example system-level block diagram for one configuration of a movable gantry system, according to embodiments of the present disclosure.

The MGS is a high-precision, robotic platform with an interface which may be able to accept various end effectors capable of performing many types of manufacturing operations that is mobile, compatible with a multitude of existing jigs, and addresses significant limitations of other existing manufacturing techniques. In the illustrative example of FIG. 1, the MGS is configured to drill, ream and countersink holes or route a panel for an airplane wing, tail, fuselage section or any compatible structure. To do so, the MGS includes various components. The block diagram in FIG. 9 illustrates examples of such components which may be combined to form the MGS. In the illustrative example of FIG. 9, the MGS may include, among other components, a System Controller 7 and Data Networks 95, an X-Y Gantry Module 86, a Rotation and Clamping Module 87, one or more End Effectors 16, a Radio Frequency Identification (RFID) system 88, and a Gantry Locking System 91. Each of these components is further described herein next.

Computer Systems and Data Networks

In an example, a MGS may implement a number of computer systems:
1. MGS System Controller
2. MGS Module Controllers
3. Manufacturing and Progress Data Server In an example, the data network 95 communicatively couples the X-Y Gantry Module Controller 86, End Effector Module Controller 16, and the System Controller 7 such that data can be exchanged between these components. The data network can include a public network, such as the Internet, a private network such as an intranet, or a communication bus such as RS-232.

In an example, the MGS is equipped with a master controller, referred to herein as the System Controller 7. This controller acts as the conductor of the MGS, coordinating the activities of other MGS subsystems, e.g. an X-Y Gantry Module, and managing part program and progress data from, e.g., a Manufacturing and Progress Data Server. Each Module can have a dedicated controller to direct actions internal to that module. For example, the X-Y Gantry Module Controller 096 can be communicatively coupled with the System Controller through a local Machine Network and be configured to take instructions from the System Controller to effect motions along the X-Axis and Y-Axis, and to perform other functions internal to that Module. Other Modules can have their own controller to manage activities local to that subsystem.

In the example embodiment illustrated in FIG. 9-12, the various computing systems are depicted as running on several discrete computing systems: the System Controller, the various Module controllers. In the present embodiment, these computing systems are communicatively coupled via a Machine Network, an intranet exclusive to the robot. Other embodiments could have all the software from each of the System and Module Controllers running on one computing system which can be embedded within the MGS, or located elsewhere and networked with it. Any combination of any axes, any accessories, and any computing system can be possible when such components are in communication and are configured to support the calculation proper trajectories for each of the axes and the directing of the accessories to perform operations depending on the application.

In an example, the computing system is configured to store a part model, a history of operations performed on the part, logic for controlling components of the gantry and/or end effector. In the present disclosure as illustrated in FIG. 9 this computing system is called a Manufacturing and Progress Data Server 86. Such a server can be used to store information like engineering data of the assemblies to be processed, and machine part program, such as G-Code programs. For record keeping, each operation such as referencing datums, loading tools, and drilling holes can be recorded into the Manufacturing and Progress Data Server as it occurs in real time. During or after operations are completed, it is possible to query Manufacturing and Progress Data Server to determine, for example, which cutting tools were used at what time to process any specific Serial Number.

In the present embodiment illustrated in FIG. 9, the Manufacturing and Progress Data Server is running on a computer system networked with the MGS over an Enterprise Network, e.g. a network owned and managed by the end user of the System. Such a Server can be implemented as a software function. In other embodiments, this software could be programmed to run on the System Controller 7 or a different computer physically mounted to the MGS and networked with the system.

X-Y Gantry Module

In the present embodiment, the X-Y Gantry provides the physical structure of the system. The module can be fabricated of steel weldment or extrusion frame construction. Control cabinets containing the System Controller 7 and other electronics can be mounted to the Gantry to create a self-contained, movable system. The X-Y Gantry can ride on casters or other locomotion devices to enable the system to move about a facility to interface with a variety of suitable jigs and workstations. A Gantry Locking System can be fixed to the X-Y Gantry to kinematically interface the system with the Jigs.

In the present embodiment, the X-Y Gantry system allows linear motion in the X and Y axes of the machine. In the present embodiment this allows the machine to translate the End Effector in vertical and horizontal directions. This is accomplished with two servo driven linear actuators translating carriages on linear guides mounted to the frame. A dedicated microprocessor based X-Y Gantry Module Controller coordinates the two servo drives, takes commands from and reports faults to the System Controller.

One possible configuration of components of an X-Y Gantry module is illustrated in FIG. 1. The gantry is moveable, mounted on casters, air bearings, or other manual displacement means, or could be moved using an automated mover such as an Autonomous Guided Vehicle (AGV). FIG. 1 portrays the ability of the mobile gantry system to translate the end effector along the longitudinal (X-Axis), and transverse (Y-Axis) directions. The gantry frame 1 provides rigidity of the assembly and mounting for the X-Axis Actuator 2, X-Axis Guide 3, Indexing Features 6, System Controller 7, Jig ID RFID Sensor 8, and any other accessories. A servo actuator translates the Y-Axis Actuator 4 along the X-Axis using an X-Axis Actuator 2. An X-Axis guide 3 maintains the squareness of the Y-Axis to the X-Axis. A second servo-driven actuator, the Y-Axis Actuator 4, translates the Rotation and Clamping Module 5 along the Y-Axis. The servo actuators could be a screw, a rack and pinion, a timing belt, a linear motor, or any other type of actuator that is fit for that purpose. An embodiment could include a Jig ID RFID Sensor 8. Such a sensor could be used to localize the system within a factory. RFID is not the only localization scheme possible; others could include barcodes or QR codes on Jigs or on the floor, or a trained operator could inform the system of its location through a graphical user interface in order for the System Controller to select the correct part program from a Manufacturing and Progress Data Server.

Rotation and Clamping Module

Figure 2:
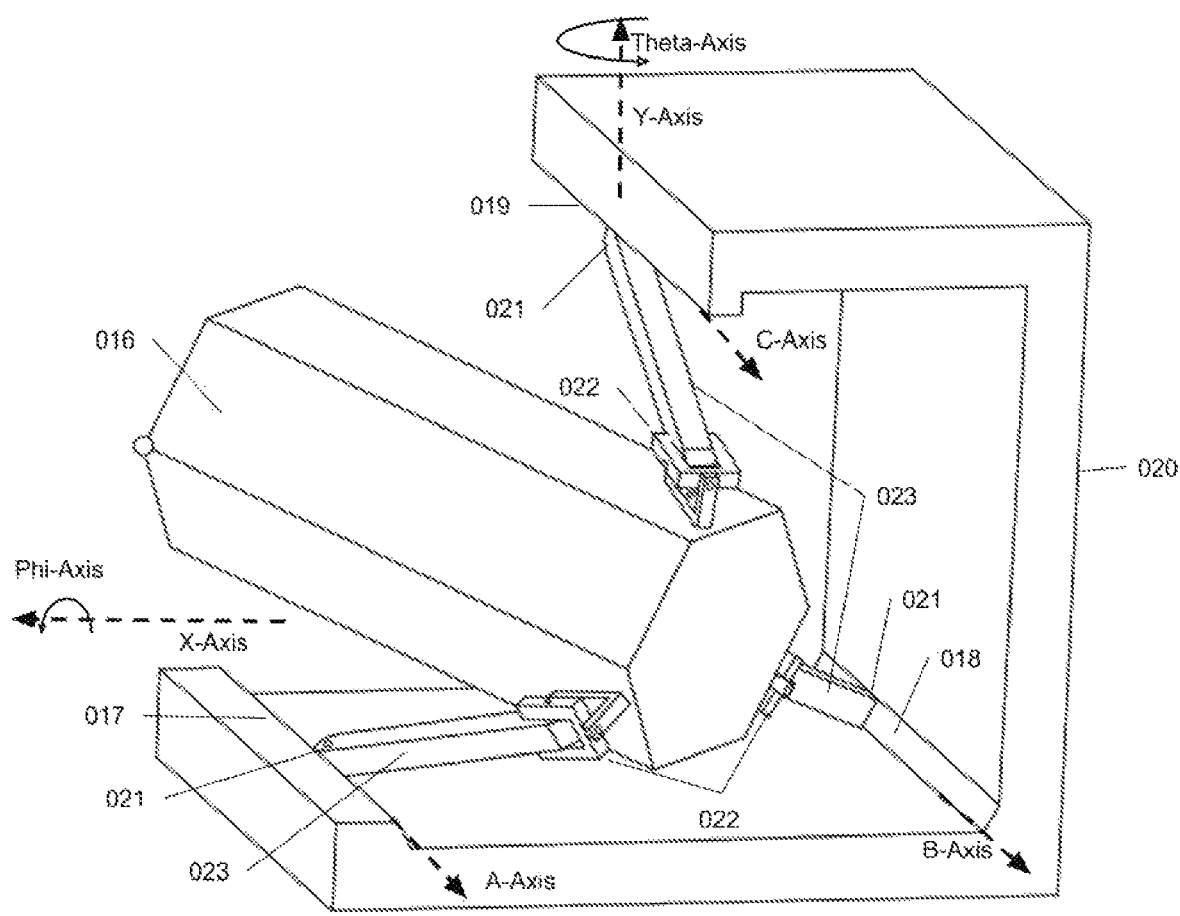
FIG. 2 illustrates an example Rotation and Clamping Module with an End Effector, according to embodiments of the present disclosure.

In an example, a Rotation and Clamping (RAC) Module 5 can be mounted serially at the end of the X-Y Gantry. FIG. 2 illustrates one possible mechanical configuration, with a block diagram presented in FIG. 11. In this example, the RAC Module has the ability to effect linear motion in the Z-axis direction of the machine, and rotational motions in Phi and Theta about the X and Y axes of the machine, respectively. These axes of motion in the present embodiment are generated using the Three-Prismatic Revolute Spherical (3-PRS) parallel linkage mechanism. In this embodiment, the 3-PRS mechanism consists of three identical serial linkage mechanisms arranged radially and grounded to an Interface Plate 20. Each linkage mechanism comprises a servo driven Prismatic link with associated Axis Controller 107, coupled by a Revolute joint 21 with a fixed length linkage 23. This linkage is Spherically coupled 22 with a moveable End Effector. Other mechanisms are possible with different arrangement or types of actuators, more or fewer axes of motion or linkages, depending on the application.

In an example, the RAC Module can be equipped with a camera system with computer vision software 115. This camera can be used for datuming the system by taking pictures of reference features (e.g. holes, edges, fiducial targets) and calculating transforms based on the position of these reference features. The camera also assists with a surface normalization function. The RAC Module can project laser crosshairs 116 onto the surface to be normalized too. It can use the camera vision system to pick up the projection of the laser beams on the surface and calculates the angle of the RAC Module to the surface based on the observed projection of the lines. Normalization is achieved by actuating Phi and Theta axes into position by visual servoing. Other normalization sensing schemes are also possible, including those using contact pressure sensors, ultrasonic distance sensing, or other means.

In an example, the RAC Module can be equipped with a Load Cell 114 to support force-feedback clamping of the nosepiece to the surface while drilling. Once the angle of the surface has been determined and the RAC Module is normalized, the MGS can approach the surfaces in the normalized direction to clamp. Once in contact with the surface, the system clamps up to the assembly using the load cell feedback to apply a precise clamping force.

End Effector Module

The End Effector of a robot is the device on the end of the manipulator which performs the robotic task. End effectors which could be integrated with the MGS include welders, paint sprayers, additive manufacturing nozzles (3D filament printers), drills and routers, among others. In the present embodiment, a Drilling End Effector 16 is mounted within the RAC Module. The MGS can control the End Effector position and orientation by commanding the X-Y Gantry and the RAC Module to effect coordinated moves in X, Y, Z, Phi and Theta.

Figure 12:
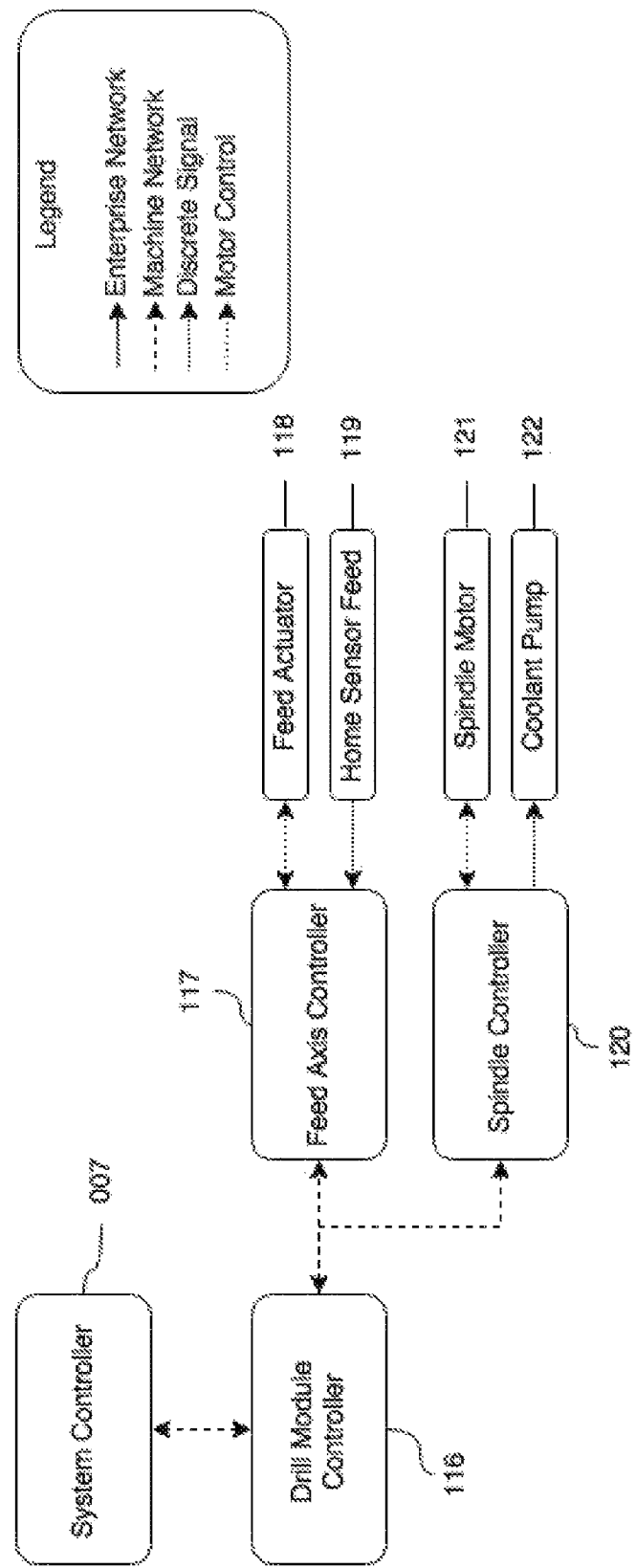
FIG. 12 illustrates an example module-level block diagram for a Drilling End Effector, according to embodiments of the present disclosure.

The current embodiment depicts a drill, ream and countersinking End Effector, FIG. 12. Among other components, a Drilling End Effector may be equipped with a Drill Module Controller 116, a Feed Axis and a Spindle Axis. A Drill Module Controller can implement software to accept commands from a System Controller 7, report status and faults to a System Controller, store parameters intrinsic to the subsystem (e.g. homing offsets, gear ratios), and coordinate Feed and Spindle Axes during operation. A Feed Axis can be equipped with a Feed Axis Controller 117 controlling a linear Feed Actuator 118 driving the stroke of the drill. Such an axis could have a motion controller controlling a motor based on motion and commands from the Drill Module Controller. That axis controller could report status and faults to the Drill Module Controller. A Spindle Axis controls Spindle rotation based on commands from the Drill Controller. It can report status and faults to the Drill Controller. Among other tasks, it could control a Coolant Pump 122 depending on drilling conditions. In other embodiments, the Drill Module Controller 116 could be omitted, with Feed and Spindle axes detected and coordinated directly by the System Controller 7.

RFID System

As illustrated in the example of FIG. 9, an RFID System can be integrated to perform at least two functions:

1. MGS localization in the plant
2. Tool identification

One function of an RFID System could be to localize the MGS in the factory, to determine which Station of which Jig the MGS is mounted on. The MGS can have an RFID Reader 88 and RFID Antenna 8 mounted to the gantry frame which allows reading tags. Tags 59 can be mounted onto Jigs in known locations, readable by the Reader on the MGS or a handheld device carried by an operator. If a Jig has multiple stations where the MGS can mount, it can have multiple RFID tags readable in each of those stations in order for the MGS to uniquely determine its position in the factory. Using the serial number encoded into the tag, the MGS queries the Server for its current station.

A second function of an RFID System could be cutting tool identification and usage tracking. Many modern cutting tool holders are capable of being equipped with an RFID chip (e.g. Balluff), and the MGS can be equipped with a Tool RFID reader 90 to read that chip. The RFID chip can be programmed with information such as Tool Type, Tool Serial Number, Diameter, and Countersink Angle, and setup parameters such as tool length offset and cycles on the cutter. The use of this type of system can help to eliminate the error of loading the wrong tool. A Part Program can call out a specific Tool Type. Rules can be implemented in the System Controller software to enforce maximum cutting tool life. When a tool is loaded, the MGS can validate that tool. It becomes impossible to use the wrong cutting tool or exceed maximum tool life.

Gantry Locking System

In an example illustrated in FIG. 9, the MGS can be equipped with a Locking System designed to index and lock the Gantry to a compatible Jig. Such a locking system could include at least kinematic indexing features 6 (e.g. locating pins and bushings) to precisely index the Gantry to the Jig, and actuators 93 to lock the Gantry to the Jig. A Gantry Locking System could include other features, such as guides to rough locate the system to facilitate properly engaging the kinematic indexing features, and sensors 92 to detect proper interfacing, stop the system and alert the operator if the locking actuators fail.

Referring again to FIG. 1, FIG. 1 illustrates one embodiment of a Movable Gantry System. In an example, the movable gantry system is configured to interface with jigs of different types or sizes and/or with different positions of a same jig and/or to perform operations on different parts mounted in such jigs. To do so, the movable gantry system includes an end effector, a gantry, and a computing system. The end effector is mounted within the gantry and provides at least rotational movement to perform operations on a part.

The gantry is movable and interfaces with a jig holding the part. Further, the gantry provides translational movement to the end effector. The computing system identifies the gantry and the assembly and controls the gantry and the end effector, thereby facilitating the operations on the assembly.

FIG. 2 illustrates an example Rotation and Clamping (RAC) Module with Drilling End Effector. As illustrated, the RAC Module can include a Drilling End Effector 16 mounted within a structure 20 able to effect rotations in two directions, Phi and Theta, and clamping in the Z-axis. The RAC Module structure has a plug and play interface for installation into a compatible interface on a gantry or other robotic positioner. The RAC Module performs normalization and force-feedback clamping on the surface to be drilled. Once normalized and clamped, the Drilling End Effector performs drilling and countersinking operations. The functionalities can be controlled via a computing system (e.g., memory and processor) local to drill module, the gantry, or remotely at a back end system (e.g., server) in data communication with the drill/gantry.

A RAC Module can be equipped with three parallel linear actuators arranged in the 3-PRS configuration. The 3-PRS parallel manipulator is made up of three serial chains of one driven Prismatic actuator, a passive Revolute joint, a linkage, and a passive Spherical joint. These three serial chains meet at the Frame structure and at the End Effector interface, forming a closed, parallel kinematic structure. The Frame is a fixed body, and the End Effector interface moves in Phi, Theta and Z-axis relative to the Frame. The three Prismatic actuators are servo driven. The actuators are commanded and coordinated by the RAC Module Controller. This controller takes commands from and communicates faults with the MGS System Controller over the local Machine Network A Drilling End Effector is one example End Effector which is compatible mechanically and electrically with the RAC Module. The drill interfaces mechanically with the RAC module at the End Effector Interface. This Drill is a self-contained module with two axes of motion: Feed and Spindle Rotation. Each axis of motion has a dedicated motion controller. These motion controllers can be coordinated by a Drill Module Controller. The Drill Module Controller can take commands from and communicate faults with the MGS System Controller over the local Machine Network.

Figure 3:
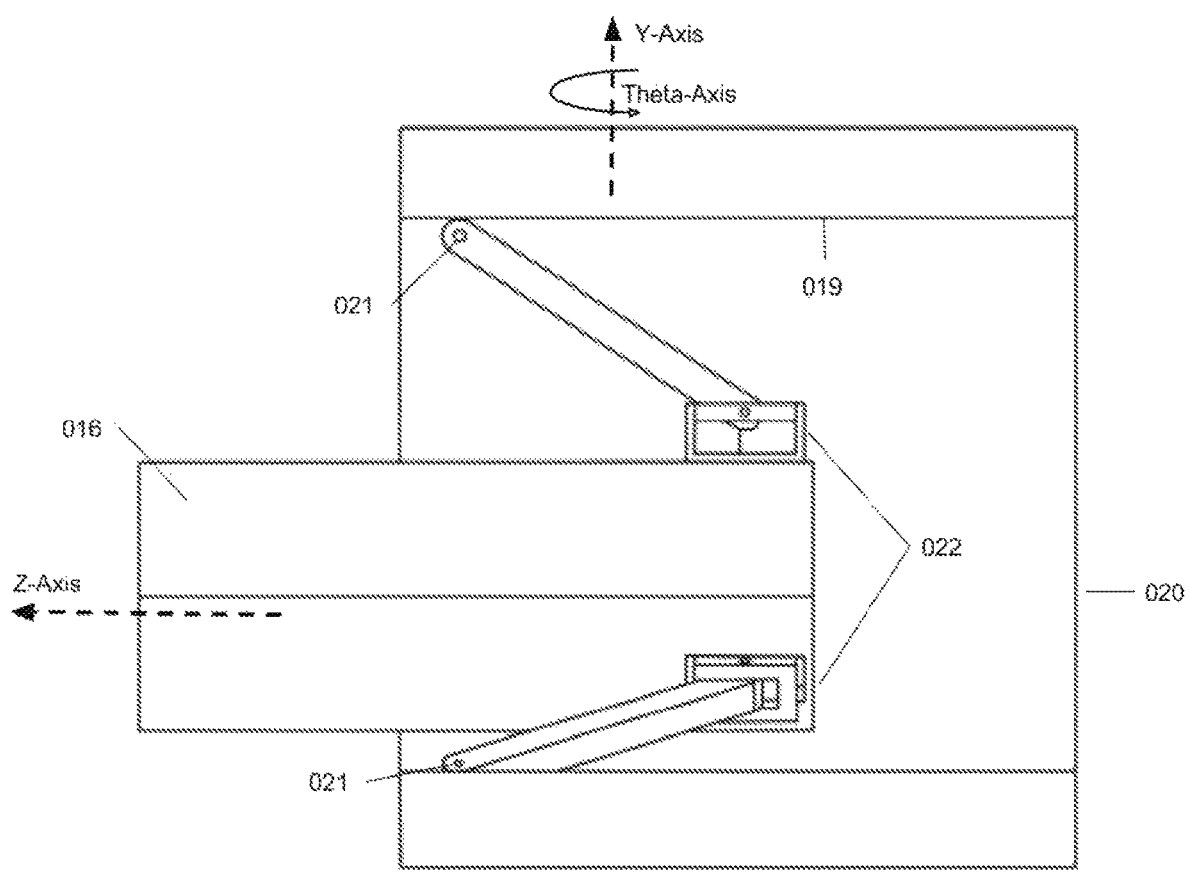
FIG. 3 illustrates an example movement of the Rotation and Clamping Module to another position, according to embodiments of the present disclosure.
Figure 4:
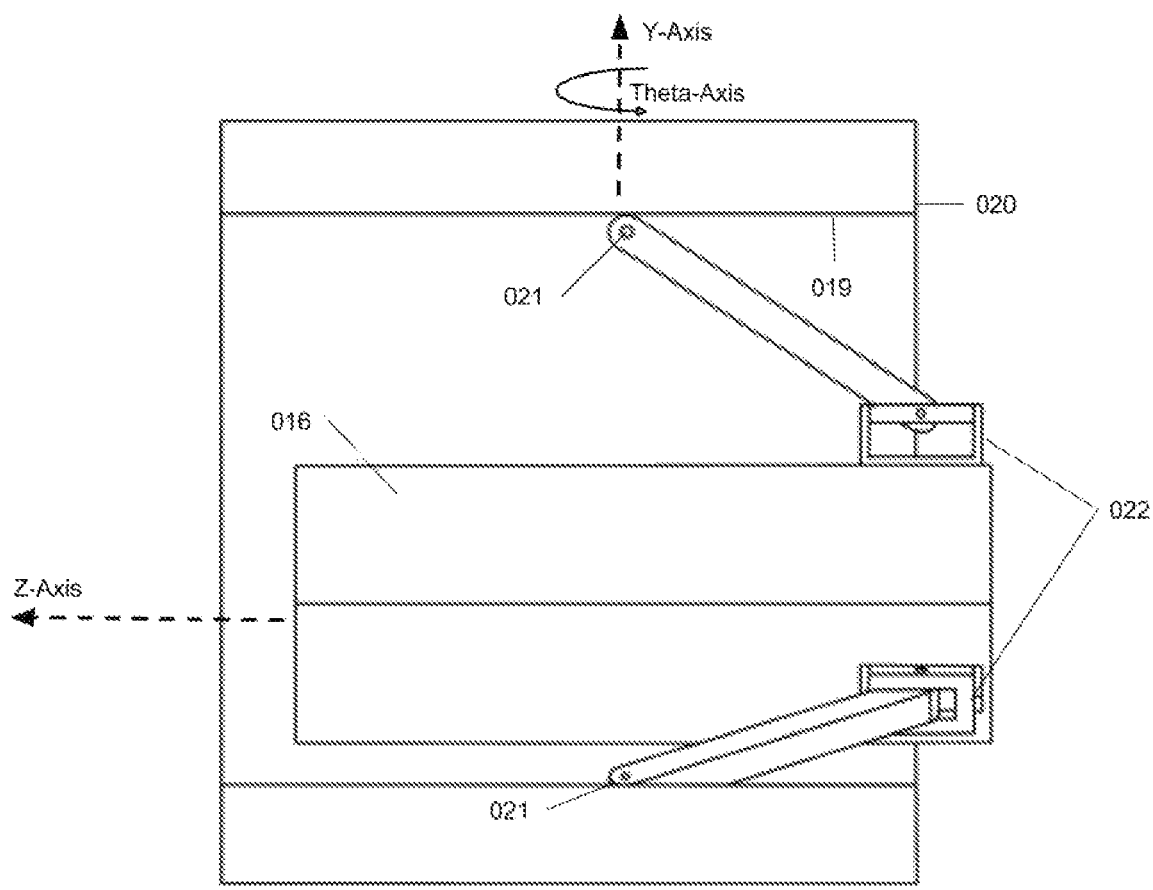
FIG. 4 illustrates another example movement of the Rotation and Clamping Module to another position, according to embodiments of the present disclosure.
Figure 5:
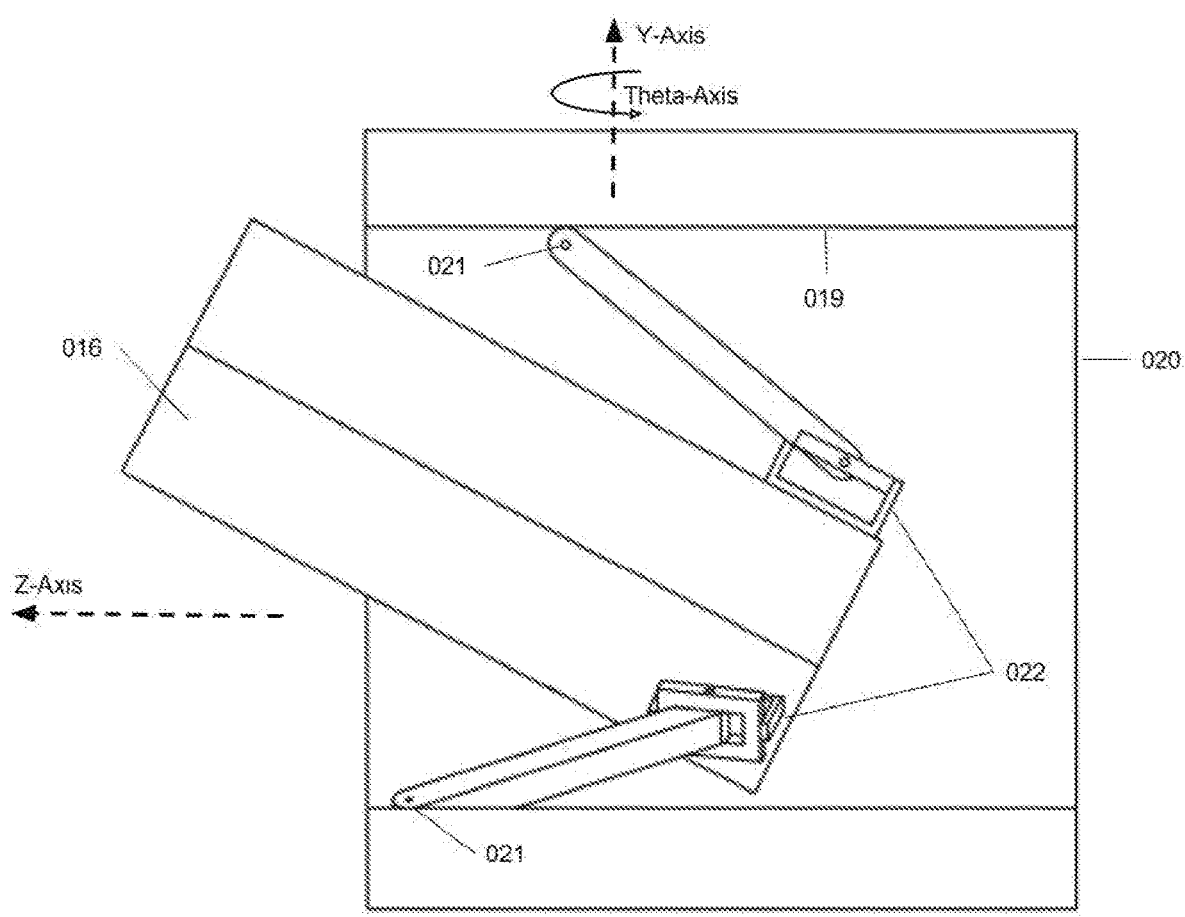
FIG. 5 illustrates another example movement of the Rotation and Clamping Module to another position, according to embodiments of the present disclosure.

FIGS. 3-5 illustrate the operation of the RAC Module moving to various positions within its operational range. The RAC Module Controller can receive] a (Phi, Theta, Z) position command from the MGS System Controller. The Module Controller uses the inverse kinematic model of the system stored on the Module Controller to calculate a set of Prismatic actuator positions which satisfies the commanded (Phi, Theta, Z) position. If the commanded pose is not satisfiable due to mechanical or other constraints of the system, the Module Controller communicates that fault back up to the System Controller. If the pose is possible, the Module Controller calculates a trajectory and then commands the three Prismatic servo actuators to move to that pose in a coordinated motion. Once the pose is achieved, Module Status is transmitted up to the System Controller, and the Module is ready for the next command. FIG. 3 illustrates the end effector in a fully retracted position with no rotation. FIG. 4 illustrates the end effector in a fully advanced position with no rotation. FIG. 5 illustrates the end effector in a pose angled in Phi and Theta midway through the Z-Axis travel.

Figure 6:
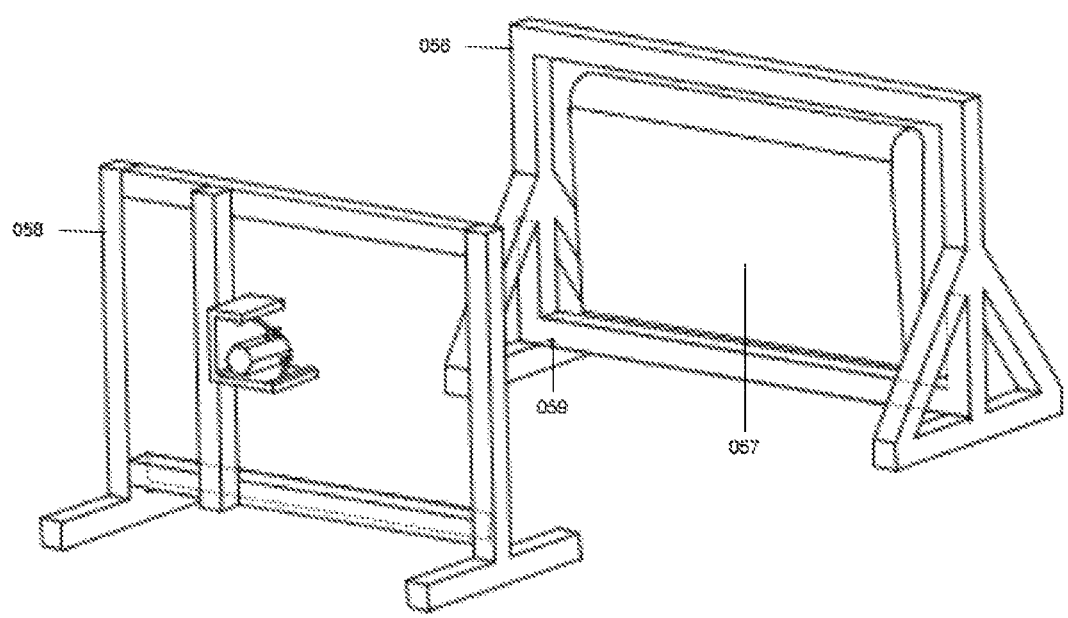
FIG. 6 illustrates an example movable gantry system ready to interface with a manufacturing jig, according to embodiments of the present disclosure.

FIG. 6 illustrates one possible embodiment of a work cell including a Movable Gantry System and an assembly jig. In the present embodiment, the MGS is configured to interface with an appropriately configured jig and perform drilling operations. The Jig is configured to index and hold elementary parts of an aircraft assembly for drilling. The gantry can be configured to be compatible with at least that jig. The jig and gantry systems are equipped with indexing features allowing kinematic mechanical interfacing. The jig can be either fixed in the factory or mobile.

Figure 7:
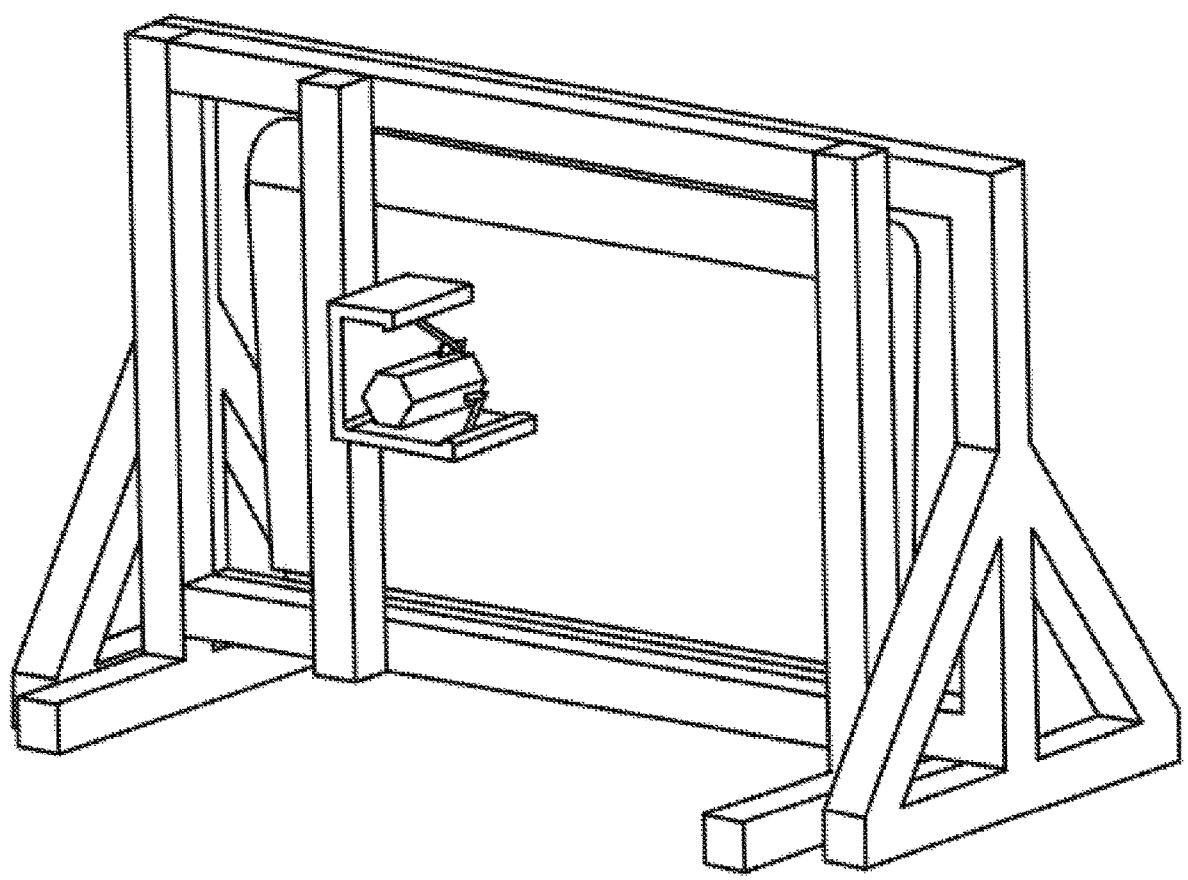
FIG. 7 illustrates an example movable gantry system interfacing with a manufacturing jig, according to embodiments of the present disclosure.

FIG. 7 illustrates an example movable gantry system interfacing with a manufacturing jig. To use this embodiment of the MGS, it first may be interfaced with a Jig. The MGS is roughly located near the Jig to be processed manually or automatically. Once it is close enough to the final position, precision kinematic mounting elements such as precision pins and bushings are engaged to mate the MGS with the Jig. Once the kinematic mounting elements are fully engaged, a locking mechanism can be used to ensure nothing moves during processing. Sensors can be used to validate the mounting and locking, and stop the system if the locks or mountings disengage.

Figure 8:
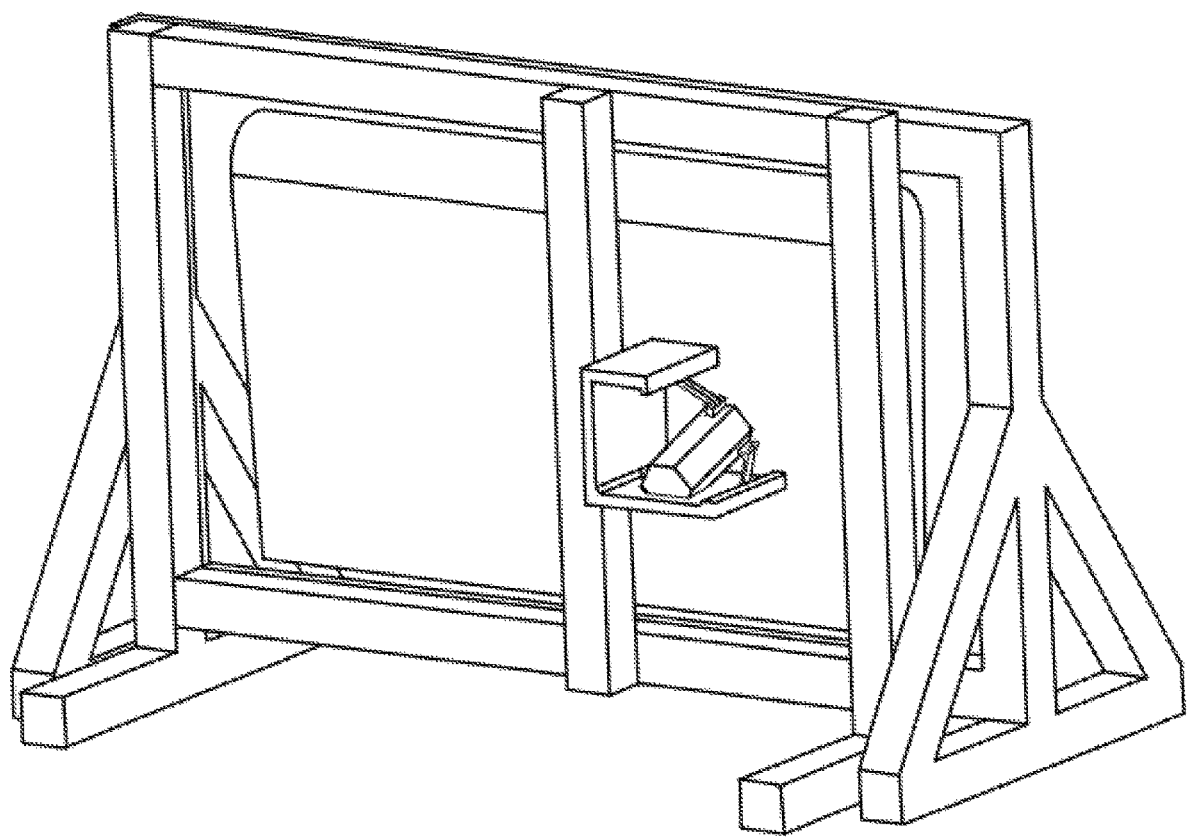
FIG. 8 illustrates another view of the example end effector available within movable gantry system, according to embodiments of the present disclosure.

FIG. 8 illustrates an example movement of the RAC Module and End Effector mounted within the movable gantry system while mounted to the Jig. The part has been recognized and datuming has been performed. The RAC Module has been commanded to normalize to the surface, has positioned itself in place, clamped up to the surface and the drilling of a hole is in progress.

FIG. 9 illustrates a system level block diagram of one embodiment of a Movable Gantry System. In an example, a MGS could be configured to include a System Controller, an X-Y Gantry Module, a Rotation and Clamping Module, a Drilling End Effector Module, an RFID Module, a Gantry Locking System, and a Manufacturing and Progress Data Server. In an example the System Controller is configured to coordinate the activities of subordinate Modules based on input data from the Server. In an example, an X-Y Gantry Module could be integrated to generate motions in the X- and Y-directions of a MGS. In an example, a Rotation and Clamping Module could be integrated to generate motions in the Z-, Phi- and Theta-axes of a machine. In an example, a Drilling End Effector could be integrated to drill holes in an aircraft assembly. In an example, an RFID Module could be integrated to aid in localizing a MGS within a factory and for cutting tool identification. In an example, a Gantry Locking System could be integrated to aid in precisely indexing a MGS with an appropriate manufacturing Jig within a factory.

Figure 10:
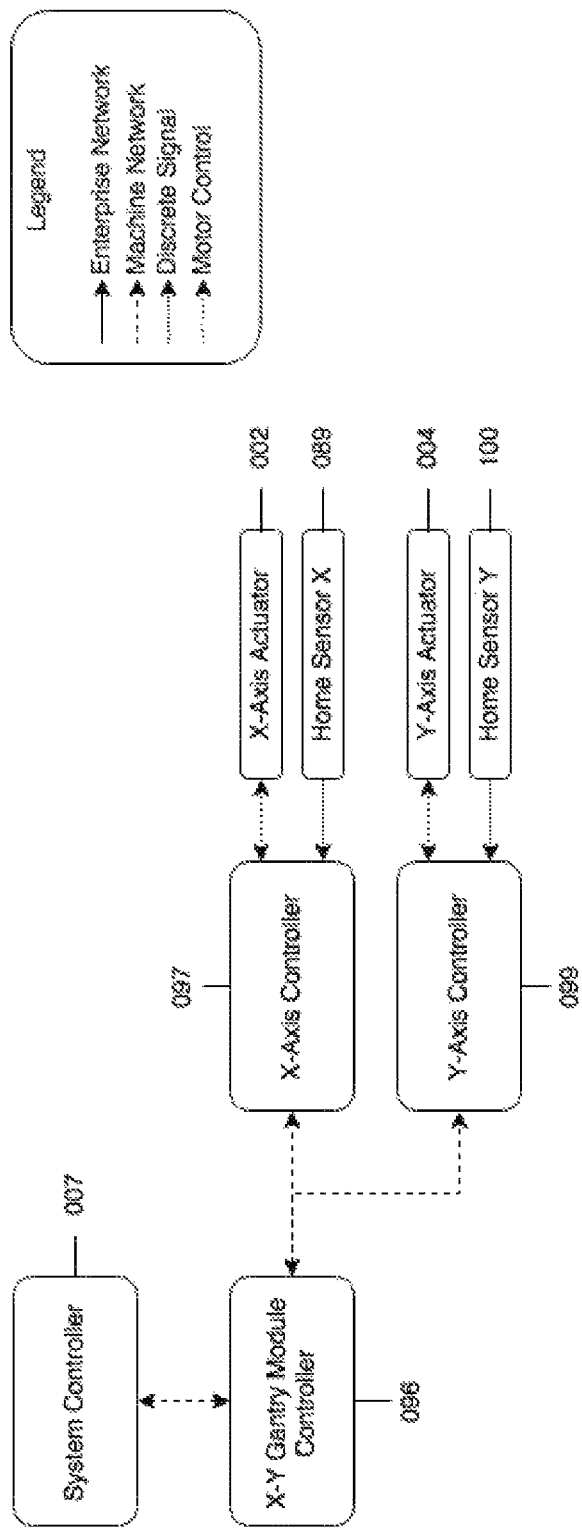
FIG. 10 illustrates an example module-level block diagram for a two axis gantry module, according to embodiments of the present disclosure.

FIG. 10 illustrates a module level block diagram of one embodiment of a MGS X-Y Gantry Module subsystem. In an example, an X-Y Gantry module is configured with a Module Controller, an X-Axis Controller, a Y-Axis Controller, and X and Y-Actuators. An X-Y Gantry Module Controller could be programmed to take commands from, and report status and faults to a System Controller. Depending on the command, the Module Controller could coordinate motions in the X and Y Axes of an MGS. In an example, the Axis Controllers could be programmed to take commands from, and report status and faults to the Module Controller. In an example, the module would be equipped with X- and Y-Axis actuators able to generate motions in the X and Y directions, respectively.

Figure 11:
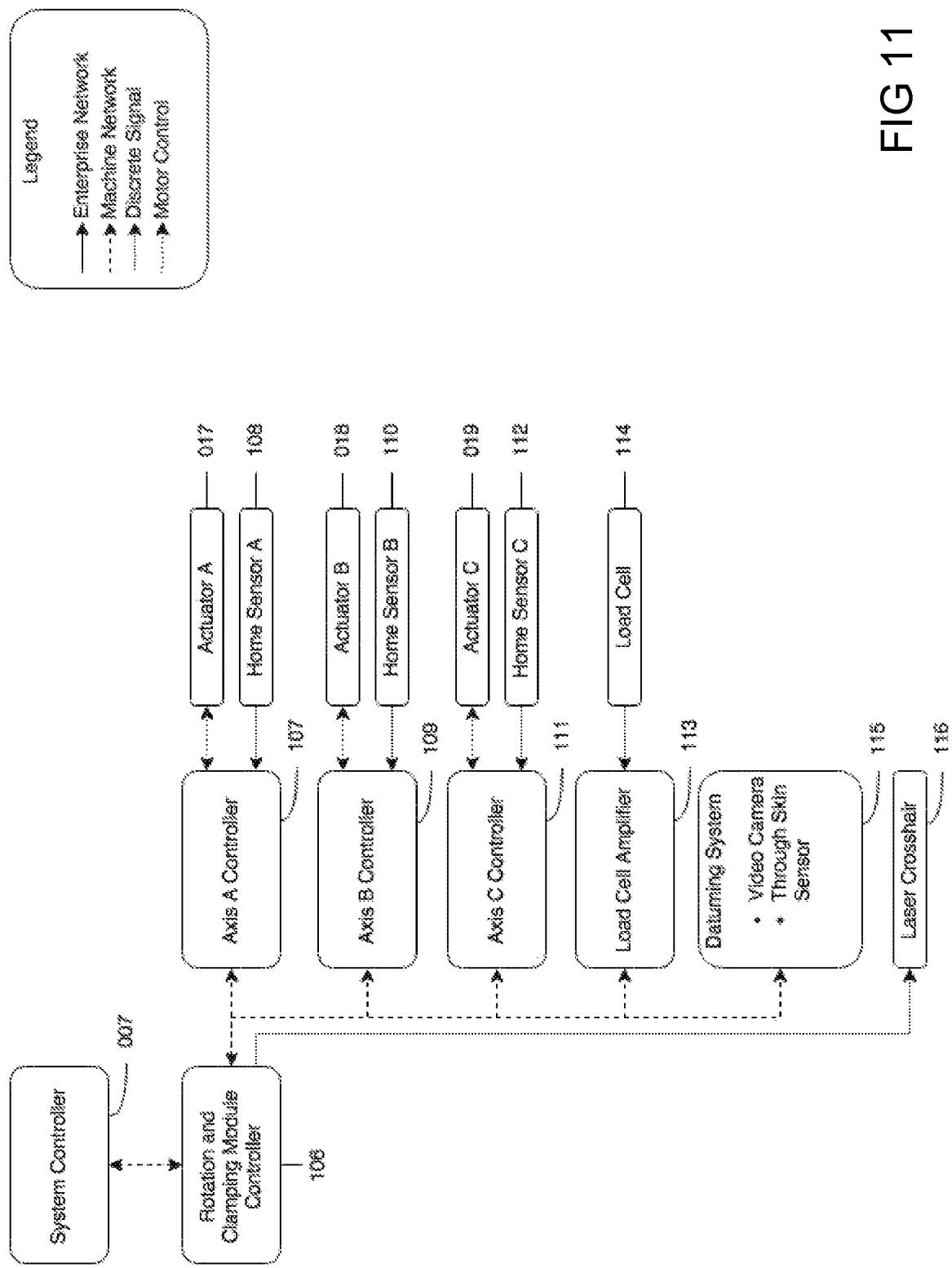
FIG. 11 illustrates an example module-level block diagram for a Rotation and Clamping module, according to embodiments of the present disclosure.

FIG. 11 illustrates a module level block diagram of one embodiment of a MGS Rotation and Clamping Module subsystem. In an example, a Rotation and Clamping Module is configured with a Module Controller, Axis Controllers A, B, and C, Actuators A, B, and C, a Load Cell, a Datuming System and a Laser Crosshair. In an example, a Rotation and Clamping Module Controller could be programmed to take commands from, and report status and faults to a System Controller. Depending on the command, the Module Controller could coordinate motions in the Z, Phi, and Theta Axes of a MGS by commanding the Axis Controllers. The Axis Controllers could be programmed to take commands from, and report status and faults to the Module Controller. In an example, the Rotation and Clamping Module could be equipped with a Datuming System such as a Video Camera. This Camera could be programmed to identify key features on an assembly to be processed to aid in the positioning of operations. In an example, the module could be equipped with a laser crosshair. In conjunction with a properly programmed camera, this laser could be used to aid in normalizing the module to the surface to be processed.

FIG. 12 illustrates a module level block diagram of one embodiment of a MGS Drilling End Effector Module subsystem. In an example, a Drill Module is configured with a Module Controller, a Feed-Axis Controller, and a Spindle Controller. A Drill Module Controller could be programmed to take commands from, and report status and faults to a System Controller. In an example, the Axis Controllers could be programmed to take commands from, and report status and faults to the Module Controller. Depending on the command, the Module Controller could coordinate the Feed and Spindle Axes to drill holes. In an example, a Spindle Controller could control the rotational speed of a spindle motor and the dispensing of coolant via a coolant pump. In an example, a Feed Axis Controller could control the position of a Feed Actuator.

Figure 13:
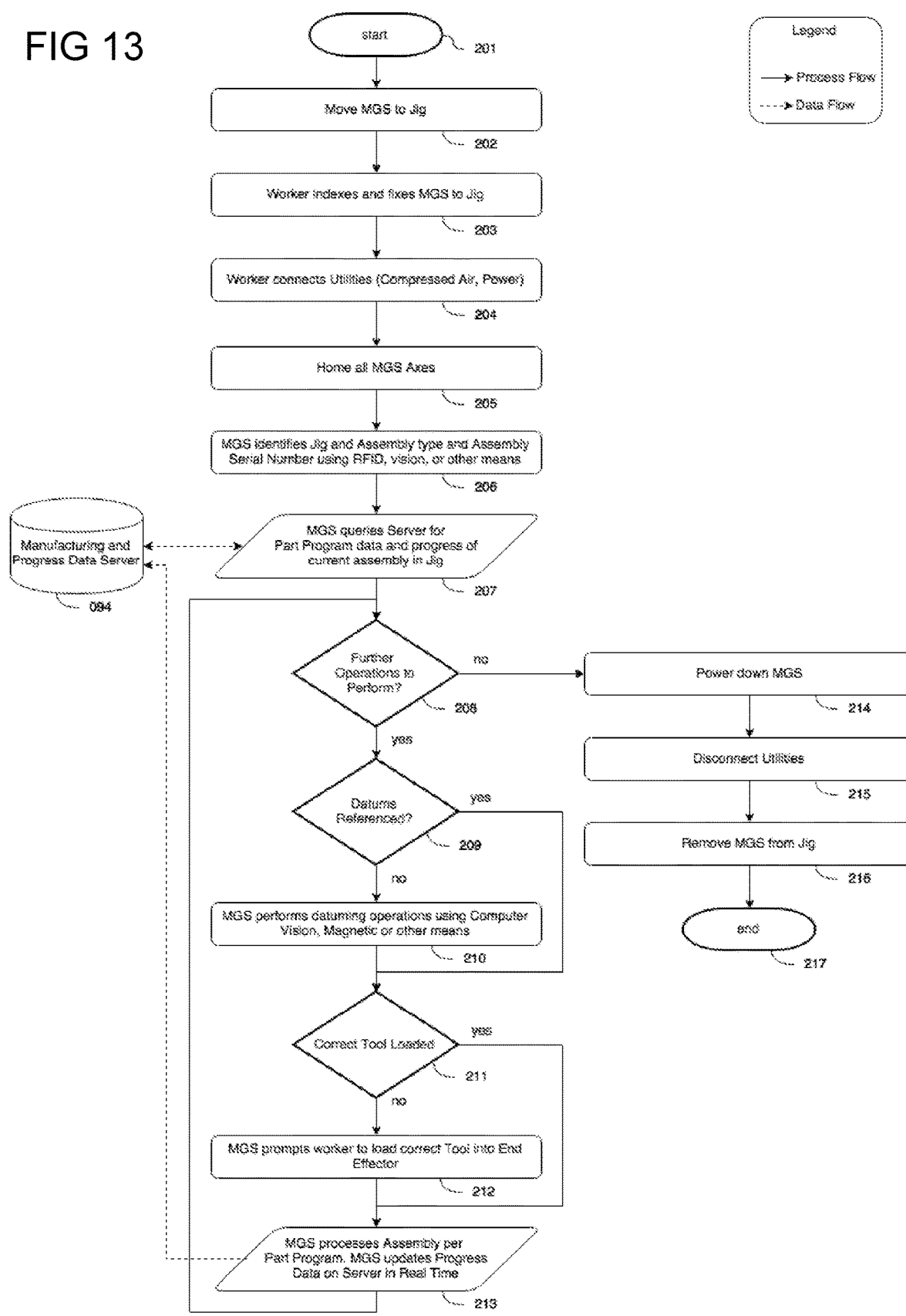
FIG. 13 illustrates an example flow for operating a movable gantry system, according to embodiments of the present disclosure.

FIG. 13 illustrates a flowchart diagramming one potential use case of the MGS being applied to drilling holes in an aircraft structure. In an example the flow chart includes multiple operations performed sequentially. Unless indicated otherwise by the context, these operations can be controlled by one or more components of the MGS (e.g., a computing system of the MGS) and/or performed by the same or one or more other components of the MGS (e.g., computing system, the gantry and/or the end effector). In the interest of clarity of explanation, the operations are described in connection with using the MGS to drill holes in a wing section and connect the wing skin to underlying structures. However, embodiments of the present disclosure are not limited as such. Instead, the illustrated flowchart of FIG. 13 and, thus, the operations can be similarly applied to other parts, operations on parts, other jigs holding other parts, applications which require no jigs to hold the parts, other end effectors, and/or other manufacturing manufactured products (e.g., automobiles). As described, the MGS can be movable and universal in the sense that it can be moved within different locations of a manufacturing environment, interface with different jigs, operate on different parts, and provide near-real-time information about the operations performed on any part.

As illustrated in FIG. 13, the process begins 201 with a ready-to-use Movable Gantry System 58 and a "loaded" jig, such as the elementary wing parts are properly positioned within a wing assembly jig, ready to be processed by drilling. FIG. 6 provides a demonstrative illustration of this step of the process.

The MGS is moved to the loaded Jig to be processed 202. The operator can place the MGS near enough to the Jig to engage the precision indexing features of the Jig and MGS to precisely and repeatably index the MGS on the Jig 203. Once MGS is indexed to the part, the worker can connect any of the necessary utilities, such as electrical power, signal cables, and compressed air 204. The operator may now power on the MGS. Using the Human Machine Interface (HMI), the operator can command the machine to "Home" 205. Each axis of motion of the machine can search for its Home Position by moving in a predetermined direction until the axis encounters a limit switch, also known as a Home Sensor. Once this sensor is found the encoder counts are "zero'd" for that axis and the position is known in Machine Coordinates.

Once the axes are all homed, the MGS may localize itself to the current Jig 206. In the present disclosure, localization can be performed using an onboard RFID reader to read RFID chips embedded in each station of each jig. However, localization could be done by manual input into an HMI, or other means. With the station determined, the MGS can determine the serial number of the assembly in the jig. This can be done through manual input into the HMI, by scanning a QR or Barcode affixed to the part, or by other means depending on the application. Once the MGS knows its current Jig, Station and which Serial Number it has to process, MGS queries the Manufacturing and Progress Data Server to determine if there are any operations to perform 207.

If there are further operations to perform 208, MGS checks if the Datums for those operations have been acquired 209. Datuming can be performed using the onboard camera, a magnetic sensor (e.g. Halo) to identify Datum features. If necessary, Datums are acquired 210. Once datums are referenced, the machine knows precisely where to drill holes. Before it can drill, the machine validates that the correct cutting tool is loaded into the spindle 211. Tool validation can be done manually by the operator or automatically if the toolholder is equipped with an RFID chip e.g. Balluff chip. If no tool is loaded or the wrong tool is loaded the machine prompts the operator to load the correct tool and validate the tool on the HMI 212. Tool loading can be automated if the machine is equipped with an automatic tool changer.

Once the gantry is mounted to the Jig, the MGS must acquire a unique Jig Location Identifier to ascertain its position within the plant. The gantry can use its onboard RFID reader to identify which jig it is interfaced with. Alternatively, the operator can scan the Jig position using a handheld RFID Reader, or the operator can scan a barcode mounted on the jig, or the operator can manually input the MGS location using the Graphical Human Machine Interface (HMI) of the system. Once a unique jig location identifier is acquired, the MGS queries the Server for next steps.

The assembly in the jig can be identified by Manufacturer Serial Number (MSN, a.k.a. Line Number). The assembly can be equipped with an identification feature such as a barcode or QR Code. The approximate location of the ID feature may be predefined and known to the Server. When the MGS informs the server where it is in the plant, the server can respond with a location in machine coordinates where to look for the Assembly ID feature. The machine would move to that position and, using the computer vision system in the RAC Module or some other means, scan the QR/Barcode and ascertain the MSN. Otherwise, the operator can manually input the MSN through the HMI.

The Server can track progress made towards completion of each Assembly that goes through the factory. Once the gantry knows where it is in the plant and which MSN it is working on, the server downloads Part Programs to the Gantry. Part programs list all datums and operations which the Gantry may perform on the assembly, in order. When the gantry receives its first part program it begins by datuming itself to the part. In the simplest case, all parts are precisely indexed to the jig and the kinematic mounting between the Jig and the MGS is sufficiently accurate to facilitate immediate processing without datuming. However, this is not always possible. Therefore, the MGS can be equipped with at least two datuming means. Datuming can be accomplished by using a vision system to scan the assembly for reference features, or by using an onboard magnetic Through Skin Sensor to detect hidden features instrumented with magnets. Once datums are acquired, the MGS can begin drilling.

The machine is now ready to drill. The MGS performs operations as laid out in the part program 213. Each operation is recorded in the Manufacturing and Progress Data Server. Once the operation is complete, the flow returns to 208. If there are no more operations to perform at the current station, the MGS is powered down 214, utilities disconnected 215, and removed 216. This marks the end of the process 217. The MGS is now ready to be applied to a different Jig, put in storage or maintained.

Figure 14:
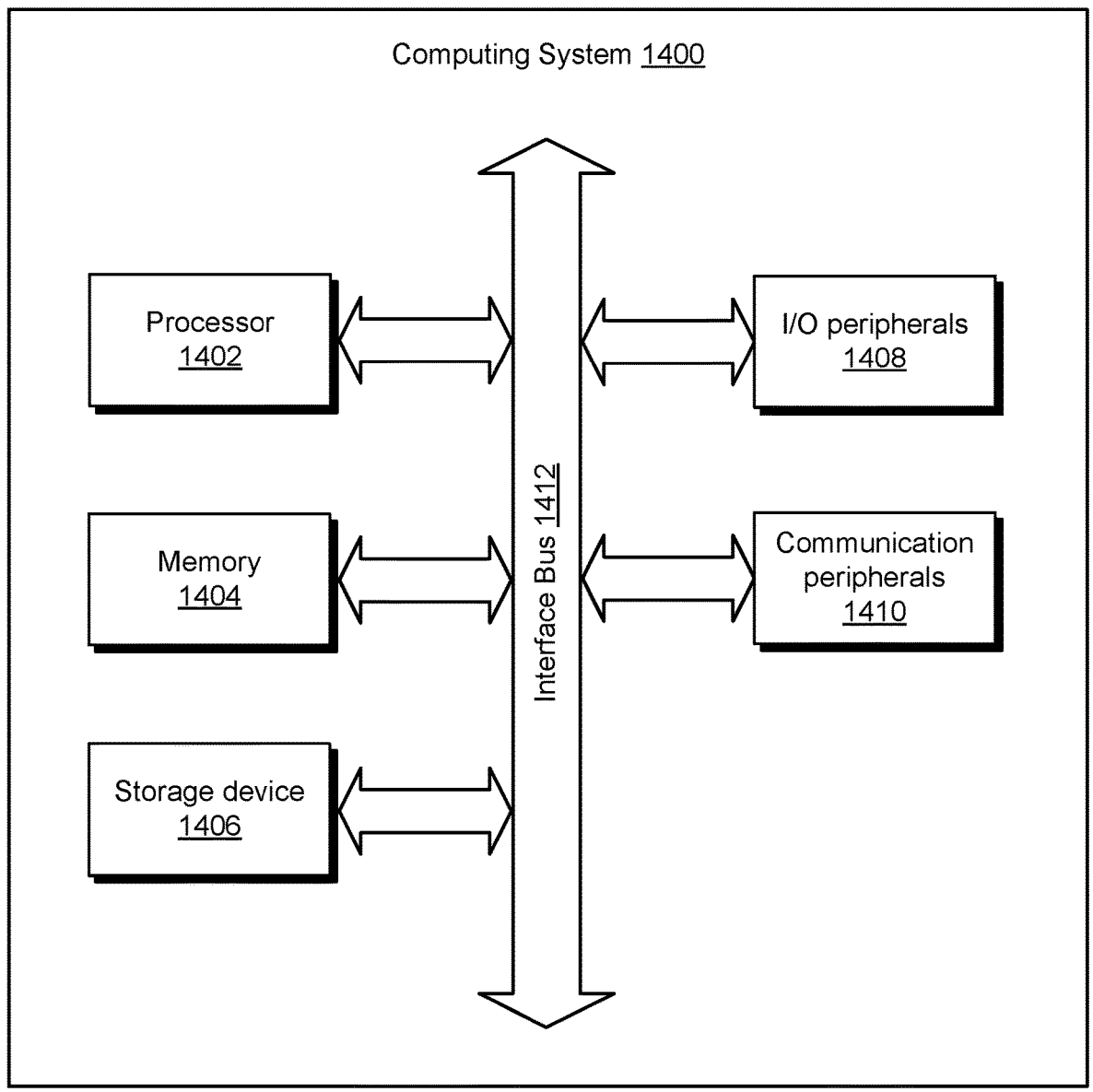
FIG. 14 illustrates an example computing system for operating a movable gantry system, according to embodiments of the present disclosure.

FIG. 14 illustrates examples of components of a computing system 1400 according to certain embodiments. The computing system 1400 is an example of the computers systems described in connection with FIGS. 1-13. Although these components are illustrated as belonging to a same computing system 1400, the computing system 1400 can also be distributed.

The computing system 1400 includes at least a processor 1402, a memory 1404, a storage device 1406, input/output peripherals (I/O) 1408, communication peripherals 1410, and an interface bus 1412. The interface bus 1412 is configured to communicate, transmit, and transfer data, controls, and commands among the various components of the computing system 1400. The memory 1404 and the storage device 1406 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1404 and the storage device 1406 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing system 1400.

Further, the memory 1404 includes an operating system, programs, and applications. The processor 1402 is configured to execute the stored instructions and includes, for example, a logical processing unit, a microprocessor, a digital signal processor, and other processors. The memory 1404 and/or the processor 1402 can be virtualized and can be hosted within another computing system of, for example, a cloud network or a data center. The I/O peripherals 1408 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1408 are connected to the processor 1402 through any of the ports coupled to the interface bus 1412. The communication peripherals 1410 are configured to facilitate communication between the computing system 1400 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A system comprising:
a movable system comprising a sensor system and dimensioned to interface with a plurality of jigs of different dimensions, the sensor system comprising at least one of an optical sensor or a magnetic sensor; and
a computing system configured to:
determine a relative position between the movable system and a jig of the plurality of jigs;
detect, based on sensor data of the sensor system, a location on a part mounted to the jig;
perform a datuming process prior to moving an end effector that is coupled with the movable system and that is associated with an operation to be performed, wherein performing the datuming process comprises:
determining based on the location and the relative position, a three dimensional position of a datum point in a coordinate system of the movable system;
determining by using at least one sensor of the sensor system, a surface of the part;
determining an angle needed to normalize the end effector to the surface of the part at the datum point,
determining based on the angle, at least a rotation about an X, Y, or Z axis of the coordinate system of the movable system, and
determining, prior to directing a translational and rotational movement of the end effector from a current position, translational X, Y, and Z data and rotational data about the X, Y, or Z axis to move and rotate the end effector from the current position to the three dimensional position and about the axis; and
direct the end effector to perform the operation in the coordinate system on the part by at least translationally and rotationally moving, after the datuming process, the end effector based on the translational X, Y, and Z data and on the rotational data.

2. The system of claim 1, wherein the computing system is further configured to:
receive a first identifier of the jig and a second identifier of the part based on proximity between the movable system and the jig;
identify the jig and the part by at least querying a database based on the first identifier and the second identifier;
access, from the database, a model of the part, the model identifying the location on the part for the operation; and
store information about a status of the operation, the information causing an update to the model.

3. The system of claim 1, wherein the relative position is determined based on kinematic indexing and locking of the movable system to the jig, wherein one or more light projections are projected from a light source of the sensor system of the movable system.

4. The system of claim 1, wherein the operation comprises the rotation of the end effector about at least two axes of the coordinate system of the movable system.

5. The system of claim 4, wherein the movable system is configured to, based on kinematic indexing of the movable system to the jig, provide a translational movement of the end effector along one or more axes of the coordinate system of the movable system.

6. The system of claim 1, wherein the computing system is further configured to access, from a database, a model of the part, wherein the model identifies the datum point and the operation based on the part, the end effector, and on a status of one or more operations already performed on the part.

7. The system of claim 1, wherein a plurality of parts having different serial numbers are individually mountable to the jig, wherein the computing system is further configured to receive a serial number of the part based on proximity between the movable system and to the jig and identify the part based on the serial number.

8. The system of claim 1, wherein directing the end effector comprises directing at least one of a position or an orientation of the end effector in the coordinate system of the movable system.

9. The system of claim 1, wherein the computing system is further configured to:
receive a first identifier of the jig and a second identifier of the part based on proximity between the movable system and the jig; and
identify the jig and the part by at least querying a database based on the first identifier and the second identifier, wherein the first identifier comprises a jig identifier (ID), wherein the second identifier comprises a part ID, and wherein the jig ID and the part ID are received separately from each other.

10. The system of claim 1, wherein the computing system is further configured to:
identify a second jig and a second part mounted on the second jig based on relocation of the movable system to a second location of the second jig, the second location being different from a first location of the jig, and the second jig having different dimensions than the jig; and
determine a second datum point on the second part in the coordinate system of the movable system.

11. The system of claim 10, wherein the movable system comprises a second end effector in lieu of the end effector when at the second location, wherein the computing system is further configured to:
direct the second end effector to perform a second operation on the second part based on the second datum point.

12. A method implemented by a computing system, the method comprising:
determining a relative position between a movable system and a jig of a plurality of jigs, the movable system comprising a sensor system and dimensioned to interface with the plurality of jigs, the sensor system comprising at least one of an optical sensor or a magnetic sensor;
detecting, based on sensor data of the sensor system, a location on a part mounted to the jig;
determining, based on the location and the relative position, a three dimensional position of a datum point in a coordinate system of the movable system;
determining, by using at least one sensor of the sensor system, a surface of the part;
determining an angle needed to normalize an end effector included in the movable system to the surface of the part at the datum point;
determining, based on the angle, at least a rotation about an X, Y, or Z axis of the coordinate system of the movable system;
determining, prior to directing a translational and rotational movement of the end effector from a current position, translational X, Y, and Z data and rotational data about the X, Y, or Z axis to move and rotate the end effector from the current position to the three dimensional position and about the axis; and
directing the end effector to perform an operation in the coordinate system on the part based on the translational X, Y, and Z data and on the rotational data.

13. The method of claim 12, wherein the relative position is determined based on kinematic indexing of the movable system to the jig, wherein the jig is associated with at least one index location, and wherein the kinematic indexing is based on the index location.

14. The method of claim 12, further comprising:
identifying, by the computing system, a second jig and a second part mounted on the second jig based on relocation of the movable system to a second location of the second jig, the second location being different from a first location of the jig, and the second jig having different dimensions than the jig; and
determining, by the computing system, a second datum point on the second part in the coordinate system of the movable system.

15. The method of claim 14, wherein the movable system comprises a second end effector in lieu of the end effector when at the second location, the method further comprising:
directing, by the computing system, the second end effector to perform a second operation on the second part based on the second datum point.

16. A non-transitory computer-readable storage medium comprising computer-readable instructions that, upon execution by a computing system, configure the computing system to perform steps comprising:
determining a relative position between a movable system and a jig of a plurality of jigs, the movable system comprising a sensor system and dimensioned to interface with the plurality of jigs, the sensor system comprising at least one of an optical sensor or a magnetic sensor;
detecting, based on sensor data of the sensor system, a location on a part mounted to the jig;
determining, based on the location and the relative position, a three dimensional position of a datum point in a coordinate system of the movable system;
determining, by using at least one sensor of the sensor system, a surface of the part;
determining an angle needed to normalize an end effector included in the movable system to the surface of the part at the datum point;
determining, based on the angle, at least a rotation about an X, Y, or Z axis of the coordinate system of the movable system;
determining, prior to directing a translational and rotational movement of the end effector from a current position, translational X, Y, and Z data and rotational data about the X, Y, or Z axis to move and rotate the end effector from the current position to the three dimensional position and about the axis; and
directing the end effector to perform an operation in the coordinate system on the part based on the translational X, Y, and Z data and rotational data.

17. The non-transitory computer-readable storage medium of claim 16, wherein the computing system is further configured to receive a serial number of the part based on proximity between the movable system and the jig, and to identify the part by using the serial number in a query to a database.

18. The non-transitory computer-readable storage medium of claim 16, directing the end effector comprises directing at least one of a position or an orientation of the end effector relative in the coordinate system of the movable system.

19. The non-transitory computer-readable storage medium of claim 16, wherein the steps further comprise:
receiving a first identifier of the jig and a second identifier of the part based on proximity between the movable system and the jig; and
identifying the jig and the part by at least querying a database based on the first identifier and the second identifier,
wherein the first identifier comprises a jig identifier (ID), wherein the second identifier comprises a part ID, and wherein the jig ID and the part ID are received separately from each other.

20. The non-transitory computer-readable storage medium of claim 16, wherein the steps further comprise:
identifying a second effector that replaced the end effector in the movable system; and directing the second effector to perform a second operation on the part.

\* \* \* \* \*